United States Patent
Fujita et al.

[11] Patent Number: 5,603,581
[45] Date of Patent: Feb. 18, 1997

[54] STRUCTURE AND METHOD FOR JOINING EXTRUDATE MEMBER AND MATING MEMBER

[75] Inventors: Shigeo Fujita; Suguru Yoshida; Masakazu Sato, all of Wako, Japan

[73] Assignee: Honda Giken Kogyo Kabushiki Kaisha, Tokyo, Japan

[21] Appl. No.: 268,614

[22] Filed: Jul. 1, 1994

[30] Foreign Application Priority Data

Jul. 2, 1993 [JP] Japan .................................. 16479593

[51] Int. Cl.$^6$ .............................. B62D 27/02; F16B 7/00
[52] U.S. Cl. ........................ 403/272; 29/897.2; 296/29; 296/205; 403/254; 403/247; 403/242
[58] Field of Search .................. 29/897, 897.2, 29/453; 296/29, 30, 203, 204, 205, 209, 187, 193, 194, 195, 196, 197; 403/253, 254, 263, 247, 244, 242, 282, 278, 272

[56] References Cited

U.S. PATENT DOCUMENTS

| | | | |
|---|---|---|---|
| 2,395,415 | 2/1946 | Maier | 29/897 X |
| 4,735,355 | 4/1988 | Browning | 29/897.2 X |
| 5,059,056 | 10/1991 | Banthia et al. | 296/29 X |
| 5,209,541 | 5/1993 | Janotik | 296/29 |
| 5,226,696 | 7/1993 | Klages et al. | 296/29 X |
| 5,271,687 | 12/1993 | Holka et al. | 296/203 X |
| 5,332,281 | 7/1994 | Janotik et al. | 296/203 X |
| 5,338,080 | 8/1994 | Janotik et al. | 296/203 X |
| 5,372,400 | 12/1994 | Enning et al. | 296/29 X |
| 5,397,115 | 3/1995 | Vlahovic | 296/29 |

FOREIGN PATENT DOCUMENTS

0547346A1  6/1992  European Pat. Off..

*Primary Examiner*—Anthony Knight
*Attorney, Agent, or Firm*—Armstrong, Westerman, Hattori, McLeland & Naughton

[57] ABSTRACT

A joint structure includes an extrudate member and an elongated mating member, in which the extrudate member has a closed sectional structure portion and has its one end joined to the elongated mating member such that the longitudinal axis of the extrudate member intersects the longitudinal axis of the elongated mating member. The one end of the extrudate member includes an integral joint portion of a shape matched to the shape of an outer surface of the mating elongated member so as to encircle at least a portion of the elongated mating member. The joint portion is bonded to the outer surface of the mating member at its longitudinally intermediate portion by brazing, spot-welding or the like.

9 Claims, 8 Drawing Sheets

STRUCTURE AND METHOD FOR JOINING EXTRUDATE MEMBER AND MATING MEMBER

BACKGROUND OF THE INVENTION

1. Field of the Invention

The present invention relates to a structure for joining an extrudate member and a mating member together, and particularly, to an improvement in a structure and a method for joining an extrudate member having a closed sectional structure portion and an elongated mating member while placing an end of the extrudate member so as to intersect the mating member.

2. Description of the Prior Art

In the prior art joining structure of this type, a butt welding joint or a joint member has been utilized at a junction between the extrudate member and the mating member.

However, if the butt welding joint is employed, a preselected joining jig is required and hence, the handling of the jig is troublesome, resulting in a degraded joining operatability. Further, if the joint member is employed, the number of parts is correspondingly increased, and the construction is complicated.

SUMMARY OF THE INVENTION

It is an object of the present invention to provide a joining structure of the type described above, wherein the need for the joint member is eliminated to provide a simplified construction, and the joining strength is enhanced.

To achieve the above object, according to the present invention, there is provided a joint structure including an extrudate member and an elongated mating member, in which the extrudate member which may be a rod like member has a closed sectional structure portion and has an end thereof joined to the elongated mating member such that the extrudate member has a longitudinal axis that intersects a longitudinal axis of the elongated mating member, wherein the extrudate member includes, at the end thereof, a joint portion having a shape conformed to a shape of an outer surface of the mating member to encircle at least a portion of the mating member, the joint portion being joined to the outer surface of the mating member.

In this joining structure, no separate joint member is used, leading to a simplified construction. In addition, since the joint portion is joined to the mating member in a state where the joint portion is matched to the outer surface of the mating member so as to encircle the latter, the structure has a high joining strength.

It is another object of the present invention to provide a joining method of the type described above, wherein the need for a joining jig which is required in use of a butt welding joint is eliminated to provide an improved joining operatability.

To achieve the above object according to the present invention, there is provided a method for joining an extrudate member and an elongated mating member, in which the extrudate member has a closed sectional structure portion and has an end thereof joined to the elongated mating member such that the extrudate member has a longitudinal axis that intersects a longitudinal axis of the elongated mating member, the method comprising: forming a notch in the closed sectional structure portion at the end of the extrudate member so as to extend longitudinally of the extrudate member; subjecting a portion of the extrudate member around the notch to a plastic working to provide a joint portion having a shape conformed to a shape of an outer surface of the mating member to encircle at least a portion of the mating member; and joining the joint portion to the outer surface of the mating member.

In the above joining method, by matching the joint portion to the outer surface of the mating member, the positioning of the extrudate member relative to the mating member can be achieved and hence, a joining jig is not required, leading to an improved joining operatability.

The above and other objects, features and advantages of the invention will become apparent from the following description of preferred embodiments taken in conjunction with the accompanying drawings.

DESCRIPTION OF THE PREFERRED EMBODIMENTS

FIGS. 1 to 7 illustrate a first embodiment of the present invention.

Figure 1:
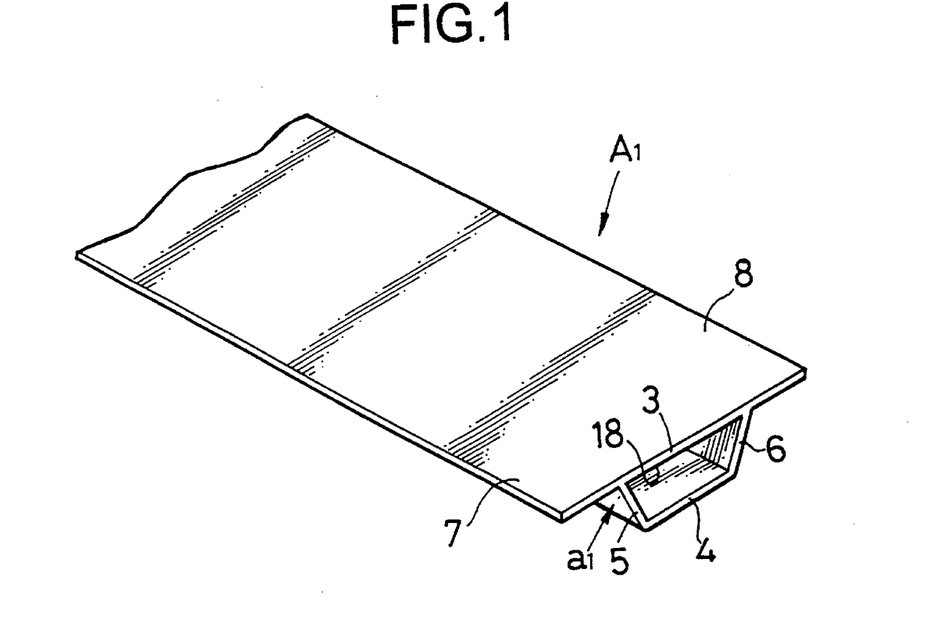
FIG. 1 is a perspective view of one example of an extrudate member.

Referring to FIG. 1, an extrudate member $A_1$ is formed from an aluminum alloy and includes a closed sectional structure portion $a_1$ having a dovetailed annular section. This closed sectional structure portion $a_1$ is comprised of a first flat portion 3, a second flat portion 4 opposed to and shorter than the first flat portion 3, a first inclined portion 5 interconnecting opposing first side edges of the first and second flat portions 3 and 4, and a second inclined portion 6 interconnecting opposing second side edges of the first and second flat portions 3 and 4. Overhangs 7 and 8 are provided on opposite side edges of the first flat portion 3 of the closed sectional structure portion $a_1$, such that they are located on the same plane as the first flat portion 3.

Figure 2:
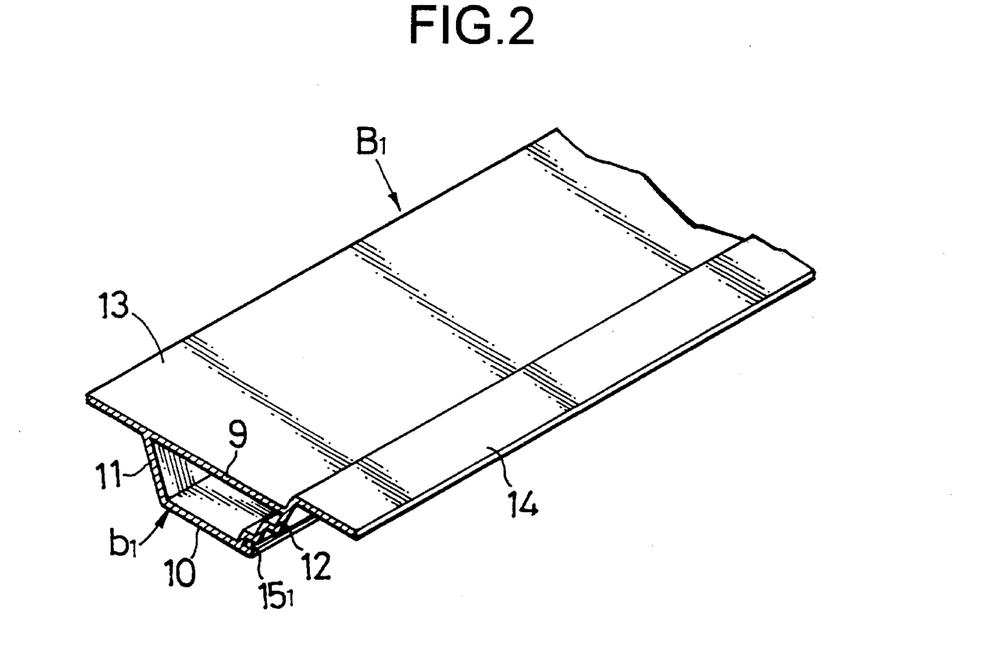
FIG. 2 is a cutaway perspective view of an essential portion of one example of a mating member.

Referring to FIG. 2, a mating member $B_1$ for the extrudate member $A_1$ is produced using an aluminum alloy material, as is the extrudate member $A_1$. The mating member $B_1$ includes a closed sectional structure portion $b_1$ having a dovetailed annular section. This closed sectional structure portion $b_1$ is comprised of a first flat portion 9, a second flat portion 10 opposed to and shorter than the first flat portion 9, a first inclined portion 11 interconnecting opposing first side edges of the first and second flat portions 9 and 10, and a second inclined portion 12 interconnecting opposing second side edges of the first and second flat portions 9 and 10. An overhang 13 is provided on one of the side edges of the first flat portion 9 of the closed sectional structure portion $b_1$, such that it is located on the same plane as the first flat portion 9. And an overhang 14 having a hook-like section is provided on the other side edge of the first flat portion 9.

The first inclined portion 11 is formed flat, while the second inclined portion 12 is formed in a stepped manner and has an engage groove $15_1$ in its outer surface to extend along the side edge of the second flat portion 10.

Figure 3:
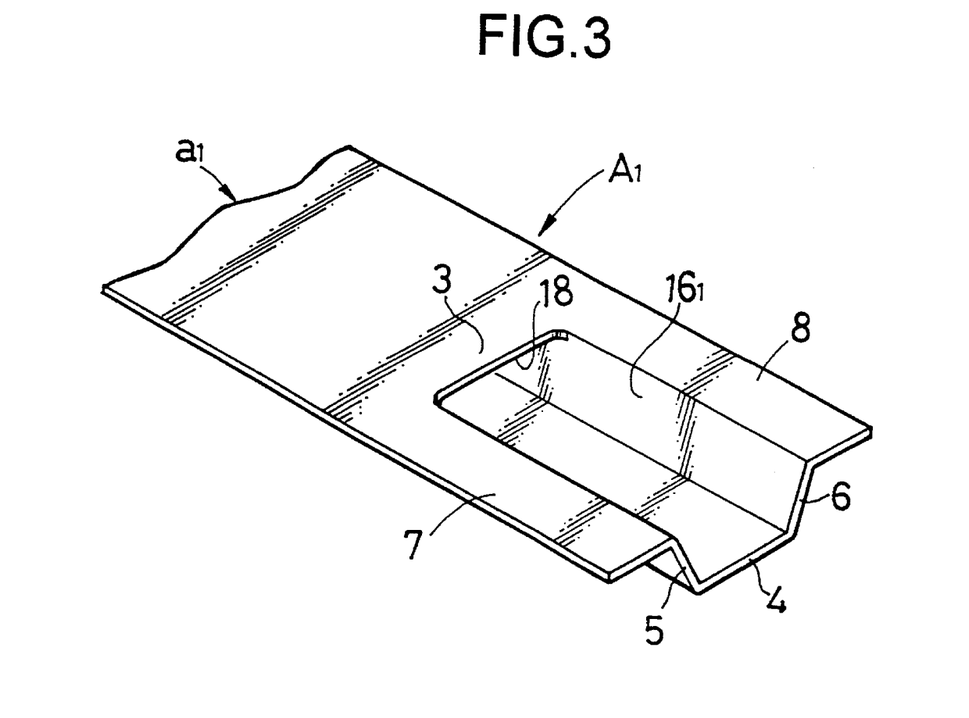
FIG. 3 is a perspective view of an extrudate member having a notch defined therein.

In order to joint an end of the extrudate member $A_1$ having the closed sectional structure portion $a_1$ to a longitudinally intermediate portion of the mating member $B_1$ such that they extend across each other, following steps are carried out in sequence:

(a) As shown in FIG. 3, the first flat portion 3 of the closed sectional structure portion $a_1$ is cut off partially at the end of the extrudate member $A_1$. to define a notch $16_1$ extending $A_1$ along the longitudinal axis of the extrudate member.

Figure 4:
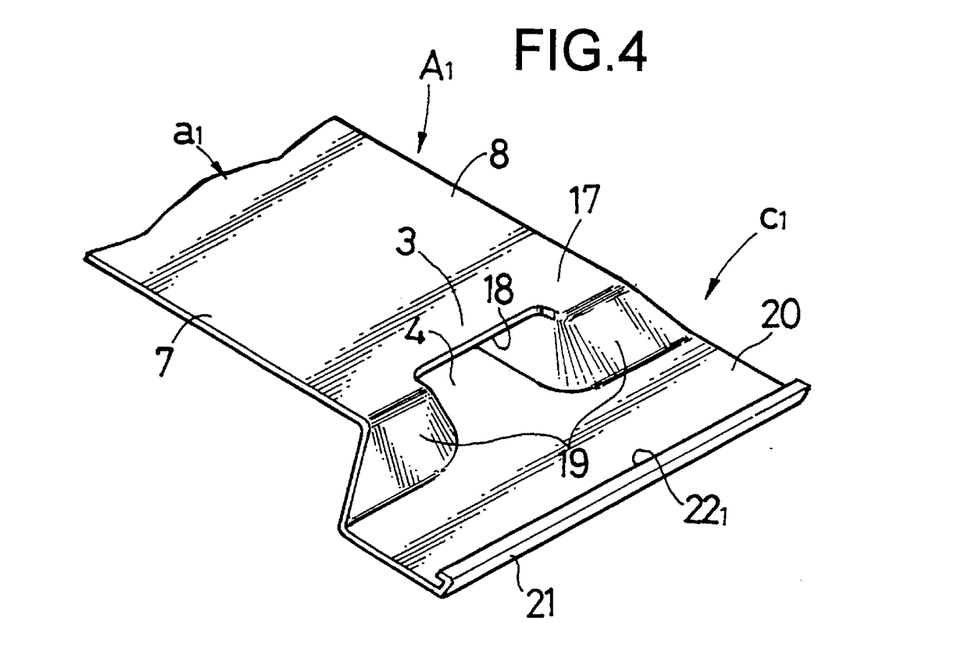
FIG. 4 is a perspective view of an extrudate member having a joint portion.
Figure 5:
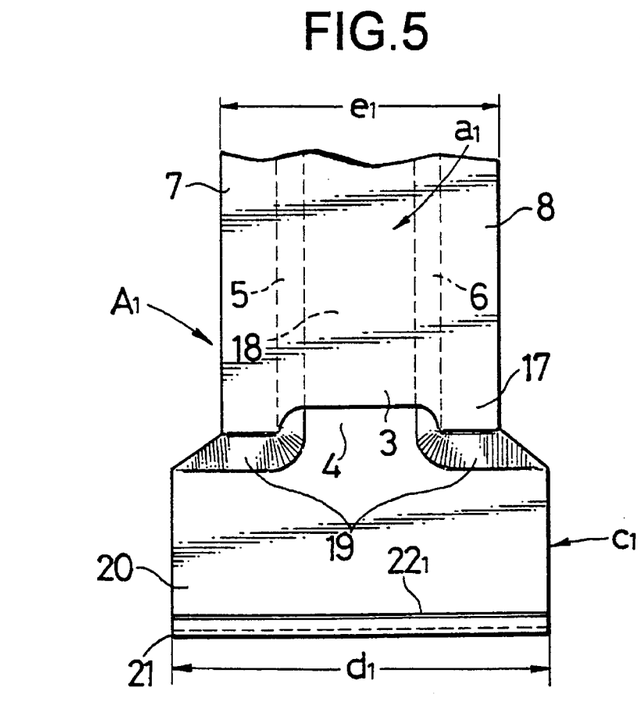
FIG. 5 is a plan view of the extrudate member having the joint portion.

(b) As shown in FIGS. 4 and 5, a portion of the extrudate member $A_1$ around the notch $16_1$ is subjected to a bending including a development as a plastic working thereby to form a joint portion $c_1$.

The joint portion $c_1$ is formed into a shape conforming to a profile of an outer surface of the mating member $B_1$, e.g., a shape of an outer surface area extending from the flat overhang 13 via the first inclined portion 11 and the second flat portion 10 to the engage groove $15_1$ of the second inclined portion 12 in this embodiment, so as to encircle a portion of the mating member $B_1$. The joint portion $c_1$ is formed out of portions of the first flat portion 3 and the overhangs 7 and 8. More particularly, the joint portion $c_1$ includes a first planar portion 17 corresponding to the flat overhang 13 of the mating member $B_1$, a first slope portion 19 which is continuously formed with the first planar portion 17 and divided into two by a dovetailed hole 18 and which corresponds to the first inclined portion 11 of the mating member $B_1$, a second planar portion 20 continuously formed with the first slope portion 19 and the second flat portion 4 and corresponding to the second flat portion 10 of the mating member $B_1$, a second slope portion 21 continuously formed with the second planar portion 20 and corresponding to a portion of the second inclined portion 12, and an engage claw $22_1$ continuously formed with the second slope portion 21 and corresponding to the engage groove $15_1$.

As is best shown in FIG. 5, the length of the joint portion $c_1$ in a direction intersecting the longitudinal axis of the extrudate member $A_1$ at right angles, i.e., the width $d_1$ (maximum width) of the joint portion C larger than the width $e_1$ of the extrudate member $A_1$ in the same direction ($d_1 > e_1$).

Figure 6:
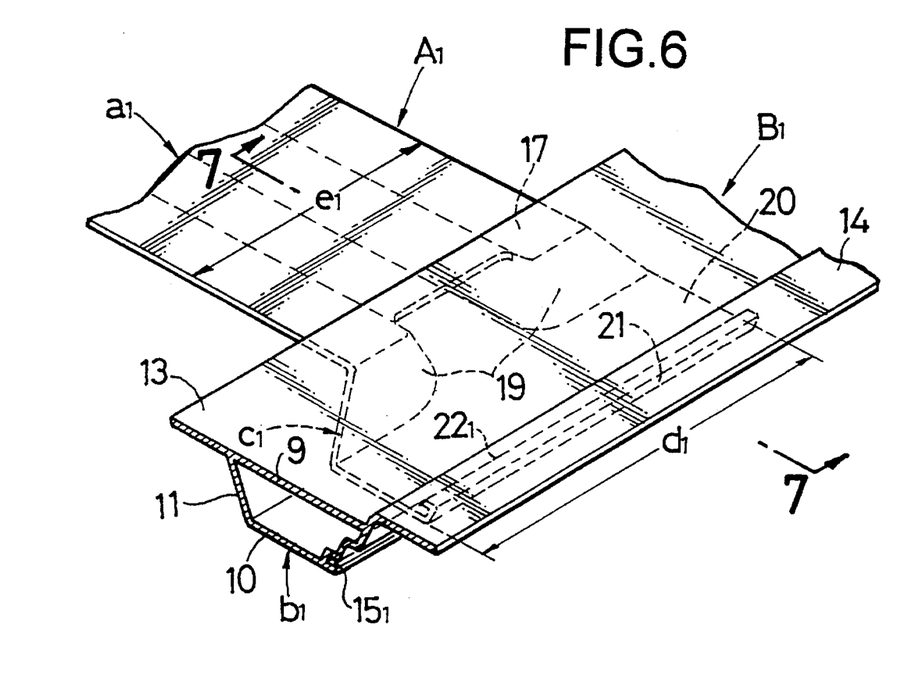
FIG. 6 is a perspective view of the extrudate member and a mating member shown as being assembled to each other.
Figure 7:
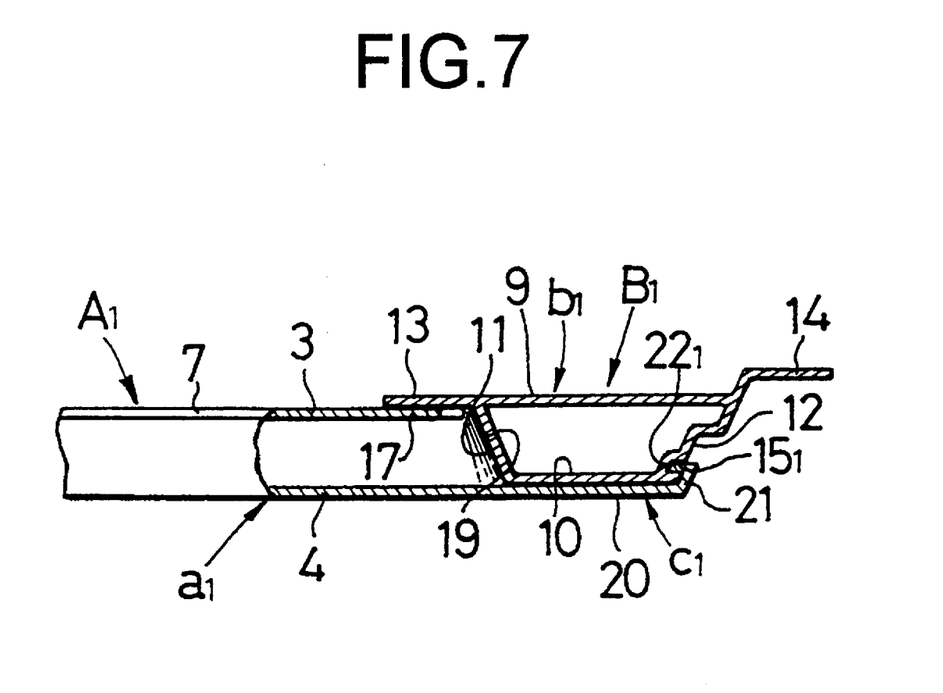
FIG. 7 is a sectional view taken along a line 7—7 in FIG. 6.

(c) As is shown in FIGS. 6 and 7, at the joint portion $c_1$ and a longitudinally intermediate portion of the mating member $B_1$, the first planar portion 17 and the flat overhang 13 are matched to each other; the first slope portion 19 and the first inclined portion 11 are matched to each other; the second planar portion 20 and the second flat portion 10 are matched to each other, and the second slope portion 21 and the second inclined portion 12 are matched to each other. In addition, the engage claw $22_1$ is brought into engagement with the engage groove $15_1$. This provides a wrapping-in or encircling effect by the joint portion $c_1$, and a latching effect by the engage groove $15_1$ and the engage claw $22_1$ and thus, the extrudate member $A_1$ and the mating member $B_1$ are assembled integrally.

(d) The superposed portions of the first planar portion 17 and the flat overhang 13 and the like, are bonded to each other by a bonding means such as a spot-welding, brazing and the like.

In the joining structure, the extrudate member $A_1$ is integrally provided at one end thereof with the joint portion $c_1$ having the shape conformed to the shape of the outer surface of the mating member $B_1$ to encircle a portion of the mating member $B_1$. The joint portion $c_1$ is joined to the outer surface of the longitudinal intermediate portion of the mating member $B_1$ and hence, no separate joint member is used. Therefore, the construction of the joining structure is simplified. In addition, the joint portion $c_1$ is joined to the longitudinally intermediate portion of the mating member $B_1$ in such a manner that it is matched to the outer surface of the longitudinally intermediate portion of the mating member $B_1$ over the relatively large width $d_1$ to encircle a portion of the mating member $B_1$, and therefore, the joining structure has a high joining strength.

On the other hand, in the joining method, by matching joint portion $c_1$ to the outer surface of the mating member $B_1$ and bringing the engage claw $22_1$ into engagement with the engage groove $15_1$, the positioning of the extrudate member $A_1$ relative to the mating member $B_1$ can be achieved. Therefore, a joining jig is not required, leading to a good operability.

FIGS. 8 to 13 illustrate a second embodiment of the present invention.

Figure 8:
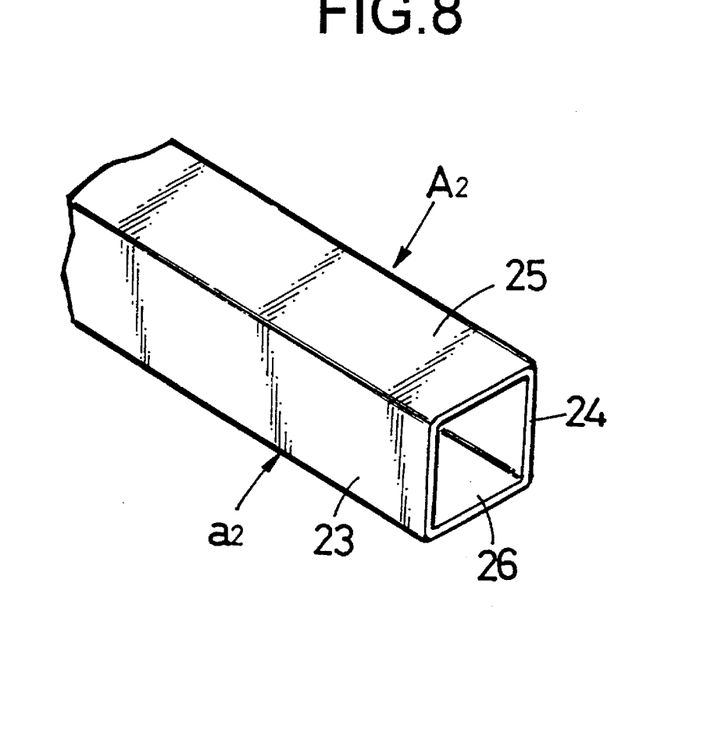
FIG. 8 is a perspective view of another example of an extrudate member.

Referring to FIG. 8 an extrudate member $A_2$ is formed from an aluminum alloy and has a substantially square annular section. Therefore, the extrudate member $A_2$ is comprised of only a closed sectional structure portion $a_2$ including two sets of opposed sidewall portions 23, 24 and 25, 26.

Figure 9:
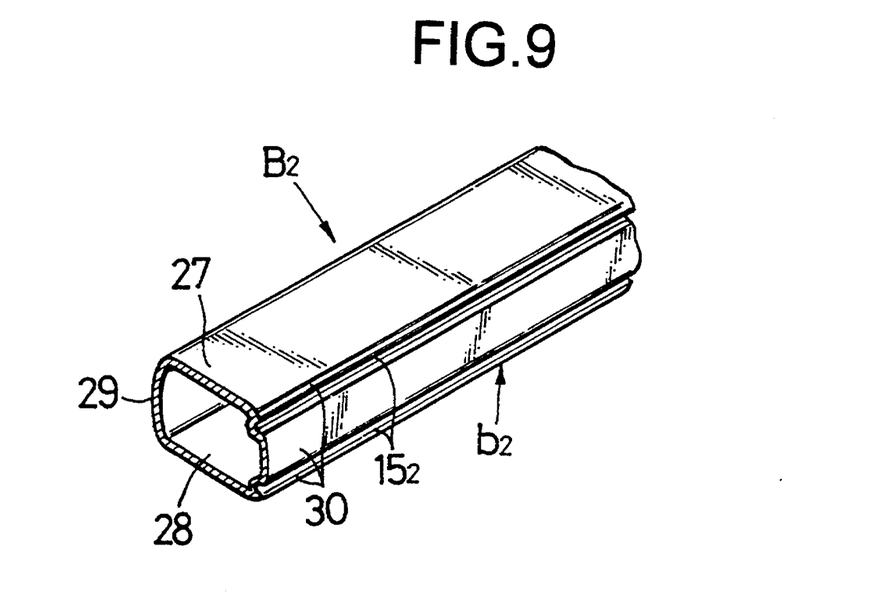
FIG. 9 is a cutaway perspective view of an essential portion of another example of a mating member.

Referring to FIG. 9, a mating member $B_2$ for the extrudate member $A_2$ is produced by an extrusion using an aluminum alloy material, as is the extrudate member $A_2$. The mating member $B_2$ is comprised of a pair opposed flat portions 27 and 28, and a pair of arcuate portions 29 and 30 interconnecting two pairs of opposing side edges of the flat portions 27 and 28, respectively, and thus, the mating member $M_1$ comprised of only a closed sectional structure portion $b_2$. A pair of engage grooves $15_2$ are defined in an outer surface of one of the arcuate portions 30 to extend longitudinally of the arcuate portion 30.

Figure 10:
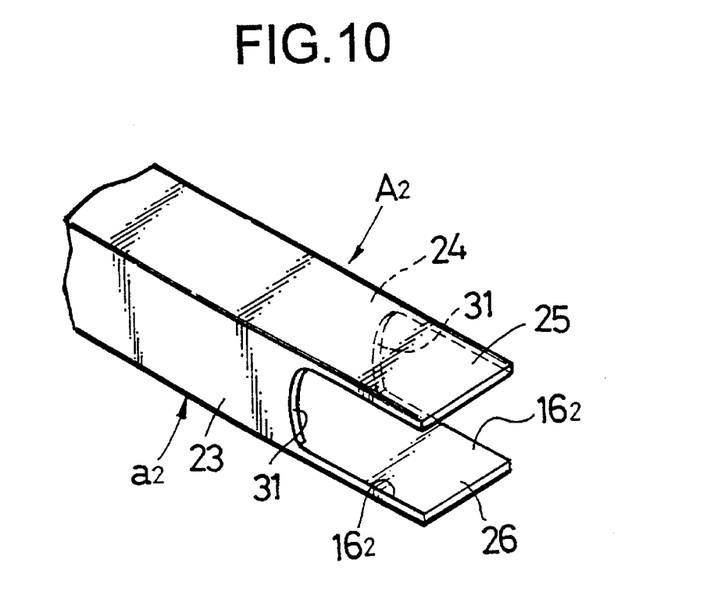
FIG. 10 is a perspective view of an extrudate member with notches defined therein.

In order to joint an end of the extrudate member $A_2$ having the closed sectional structure portion $a_2$ to a longitudinally intermediate portion of the mating member $B_2$ such that they extend across each other, following steps are carried out in sequence:

(a) As shown in FIG. 10, portions of the opposed sidewalls 23 and 24 are cut off at the end of the extrudate member $A_2$ to define a pair of notches $16_2$ extending longitudinally of the extrudate member. In this case, an inner end face of each notch $16_2$ is formed into an arcuate shape to conform to a shape of an outer surface of the arcuate portion 29 having no engage groove $15_2$ in the mating member $B_2$.

Figure 11:
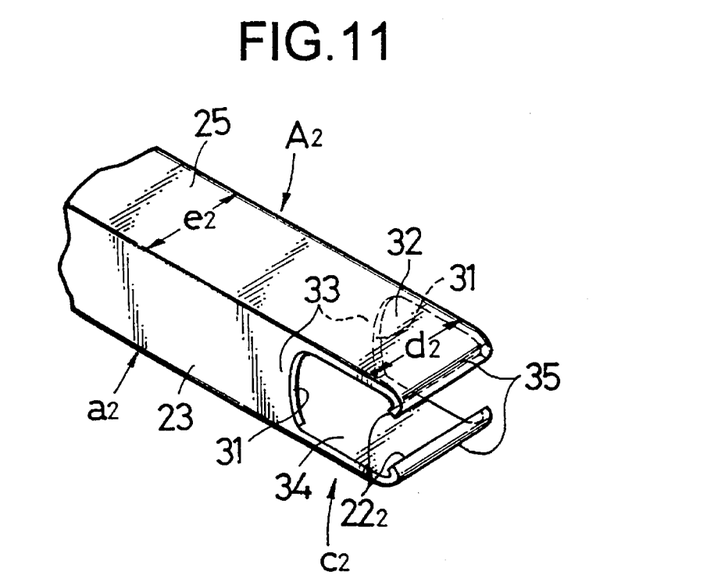
FIG. 11 is a perspective view of an extrudate member having a joint portion.

(b) As shown in FIG. 11, portions around the notches $16_2$ of the extrudate member $A_2$, e.g., tip ends of opposed sidewalls 25 and 26 of the notches $16_2$ in this embodiment, are subjected to a bending as a plastic working, thereby producing a joint portion $c_2$.

The joint portion $c_2$ is formed to have a shape conformed to the shape of the outer surface of the mating member $B_2$, e.g., the shape of an outer surface area extending from one of the engage grooves $15_2$ via one of the arcuate portions 29 and the other flat portion 28 to the other engage groove $15_2$ in this embodiment to encircle a portion of the mating member $B_2$. More particularly, the joint portion $c_2$ is comprised of a planar portion 32 corresponding to one of the flat portions 27 of the mating member $B_2$, arcuate portions 33 which are continuously formed with the planar portion 32 and formed of portions of opposite sidewalls 23 and 24 and which correspond to one of the arcuate portions 29 of the mating member $B_2$, a planar portion 34 continuously formed with the arcuate portions 33 and corresponding to the other planar portion 28 of the mating member $B_2$, arcuate portions 35 continuously formed with the planar portions 32 and 34 and corresponding to a portion of the other arcuate portion 30 of the mating member $B_2$, and engage claws $22_2$ continuously formed with the arcuate portions 35 and corresponding to the engage grooves $15_2$ of the mating member $B_2$.

In this case, the length of the joint portion $c_2$ in a direction intersecting the longitudinal axis of the extrudate member $A_2$ at right angles, i.e., the width $d_2$ thereof, is equal to the width of the extrudate member $A_2$ in the same direction ($d_2=e_2$).

Figure 12:
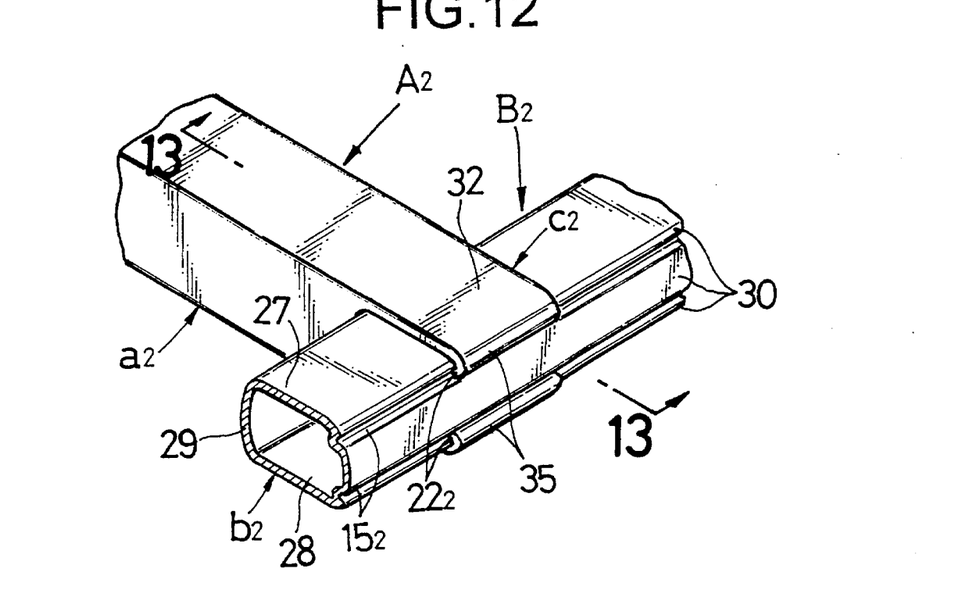
FIG. 12 is a perspective view of the extrudate member and a mating member shown as being assembled to each other.
Figure 13:
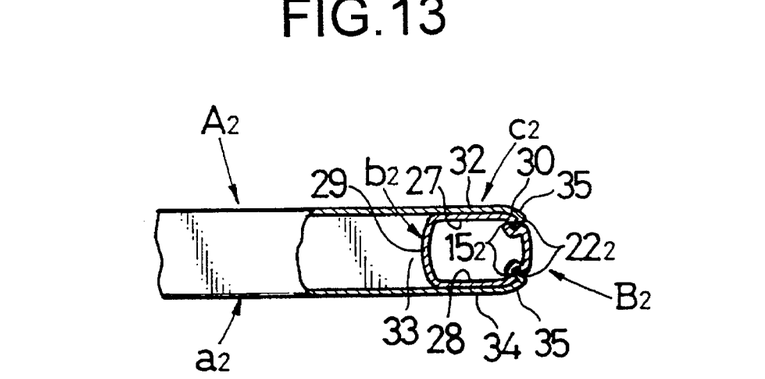
FIG. 13 is a sectional view taken along a line 13—13 in FIG. 12.

(c) As shown in FIGS. 12 and 13, at the joint portion $c_2$ and a longitudinally intermediate portion of the mating member $B_2$, the one planar portion 32 and the one flat portion 27 are matched to each other; the other planar portion 34 and the other flat portion 28 are matched to each other; the arcuate portions 33 and the one arcuate portion 29 are matched to each other; and the arcuate portions 35 and the other arcuate portion 30 are matched to each other. In addition, each of the engage claws $22_2$ is brought into engagement with corresponding one of the engage grooves $15_2$. This provides a wrapping or encircling effect by the joint portion $c_2$, and a latching effect by each of the engage grooves $15_2$ and each of the engage claws $22_2$, and thus, the extrudate member $A_2$ and the mating member $B_2$ are assembled into one piece.

(d) The superposed portions of the one planar portion 32 and the one flat portion 27 and the like, are bonded to each other by a bonding means such as a spot-welding, brazing or the like.

With the joining structure and the joining method of the second embodiment, effects similar to those of the first embodiment can be provided.

Alternatively, engage grooves $15_1$ and $15_2$ may be provided in the joint portions $c_1$ and $c_2$, and engage claws $22_1$ and $22_2$ may be provided on the mating member $B_1$ and $B_2$.

Figure 14:
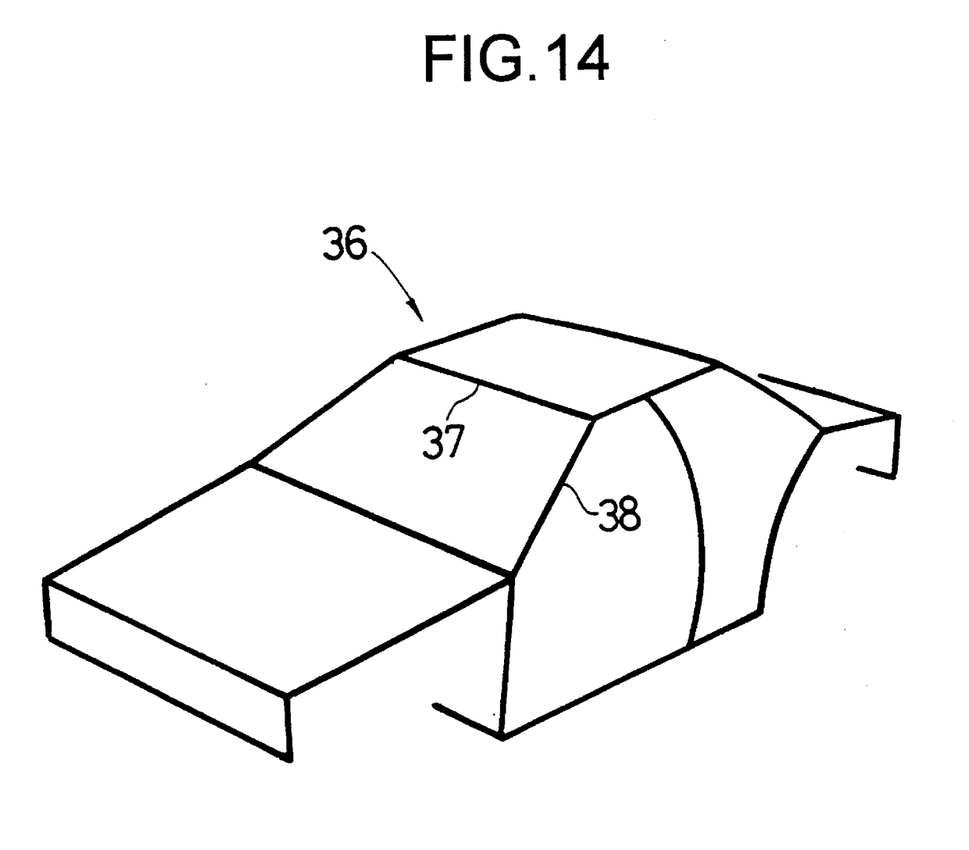
FIG. 14 is a diagrammatic perspective illustration of a frame structure for a vehicle body.

FIG. 14 illustrates a frame structure for a vehicle body. The present invention is applicable to the structure and method for joining, for example, a front roof rail 37 which is an extrudate member of an aluminum alloy, and a front pillar 38 which is an extrudate member of an aluminum alloy.

What is claimed is:

1. A joint structure, comprising:

an extrudate member having a closed sectional structure portion and at an end thereof in the extruding direction, an integral joining end: and an elongated mating member having a longitudinal axis wherein said joining end of said extrudate member is joinable with said elongated member, such that a longitudinal axis of said extrudate member intersects the longitudinal axis of said elongated mating member, and further wherein said extrudate member includes, at said joining end thereof, a joint portion extending in said extruding direction and having a shape conformed to a shape of an outer surface of said elongated mating member so as to encircle at least a portion of said mating member in the extruding direction of the extrudate member, said joint portion being joined to the outer surface of said mating member.

2. A joint structure according to claim 1, wherein one of said joint portion and said elongated mating member has an engage groove, and the other has an engage claw for engagement with said engage groove.

3. A joint structure according to claim 1, wherein said extrudate member is a hollow member, and said joint portion is obtained by subjecting said integral joining end of the extrudate member to a plastic working.

4. A joint structure, comprising:

an extrudate member having a closed sectional structure portion and an integral joining end thereof; and an elongated mating member having a longitudinal axis, wherein said joining end of said extrudate member is joinable with said elongated member, such that a longitudinal axis of said extrudate member intersects the longitudinal axis of said elongated mating member, and further wherein said elongated mating member includes a closed sectional structure portion having a substantially dovetailed annular section, said closed sectional structure portion including, (a) a first flat portion, (b) a second flat portion opposed to and shorter than said first flat portion, (c) a first inclined portion interconnecting opposing first side edges of the first and second flat portions, and (d) a second inclined portion interconnecting opposing second side edges of the first and second flat portions and having an engage groove provided in an outer surface thereof to extend along the side edge of the second flat portion, and wherein said extrudate member is integrally provided at said integral joining end thereof with a joint portion of a shape conforming to a shape of an outer surface of said elongated mating member, said joint portion being joined to said mating member so as to encircle at least a portion of said elongated mating member, said joint portion including, (a) a first slope portion matched to the first inclined portion of said mating member.

(b) a second planar portion continuously formed with said first slope portion and matched to the second flat portion of said mating member, (c) a second slope portion continuously formed with said second planar portion and matched to a portion of the second inclined portion of said mating member and (d) an engage claw continuously formed with said second slope portion and engaged with the engage groove in said mating member.

5. A joint structure according to claim 4, wherein a length of said joint portion in a direction intersecting the longitudinal of said extrudate member is longer than a length of the extrudate member in the same direction.

6. A joint structure according to claim 4, wherein said extrudate member is a hollow member which has been obtained by extrusion conducted in a direction aligned with said longitudinal axis of the extrudate member, and said joint portion is obtained by subjecting said integral joining end of the extrudate member to a plastic working.

7. A joint structure, comprising:

an extrudate member having a closed sectional structure portion and at an end thereof in the extruding direction, an integral joining end; and an elongated mating member having a longitudinal axis, wherein said joining end of said extrudate member is joinable with said elongated member, such that a longitudinal axis of said extrudate member intersects the longitudinal axis of said elongated mating member, and further wherein said elongated mating member includes a closed sectional structure portion which is comprised of (a) a pair of opposed flat portions, and (b) a pair of arcuate portions interconnecting opposed side edges of said flat portions, respectively, one of said arcuate portions being formed with a pair of engage grooves on an outer surface thereof so as to extend longitudinally of said arcuate portion, and further wherein said extrudate member is integrally provided at said integral joining end with a joint portion which extends in said extruding direction and has a shape conforming to a shape of an outer surface of said mating member, said joint portion being joined to the mating member so as to encircle at least a portion of said elongated mating member in the extruding direction of the extrudate member, said joint portion including, (a) one planar portion matched to one of said flat portions of said elongated mating member, (b) arcuate portions continuously formed with said one planar portion and matched to one of said arcuate portions of said elongated mating member, (c) another planar portion continuously formed with said arcuate portions and matched to the other flat portion of said elongated mating member, (d) further arcuate portions continuously formed with said respective planar portions and matched to a portion of the other arcuate portion of said elongated mating member, and (e) engage claws continuously formed with said further arcuate portions respectively and matched to the engage grooves of the elongated mating member, respectively, and matched to the engage grooves of the elongated mating member, respectively.

8. A joint structure according to claim 7, wherein said extrudate member is a hollow member, and said joint portion is obtained by subjecting said integral joining end of the extrudate member to a plastic working.

9. A joint structure according to claim 1, 2, 4, 5 or 7, wherein each of said extrudate member and said mating member is formed from an aluminum alloy, and said mating member is also produced by extrusion.

* * * * *